Dec. 20, 1966    J. M. SCOFIELD ETAL    3,292,446
POWER TRANSMITTING GEARING WITH FULL FLOATING GEAR ELEMENTS
Filed Oct. 31, 1963    3 Sheets-Sheet 1
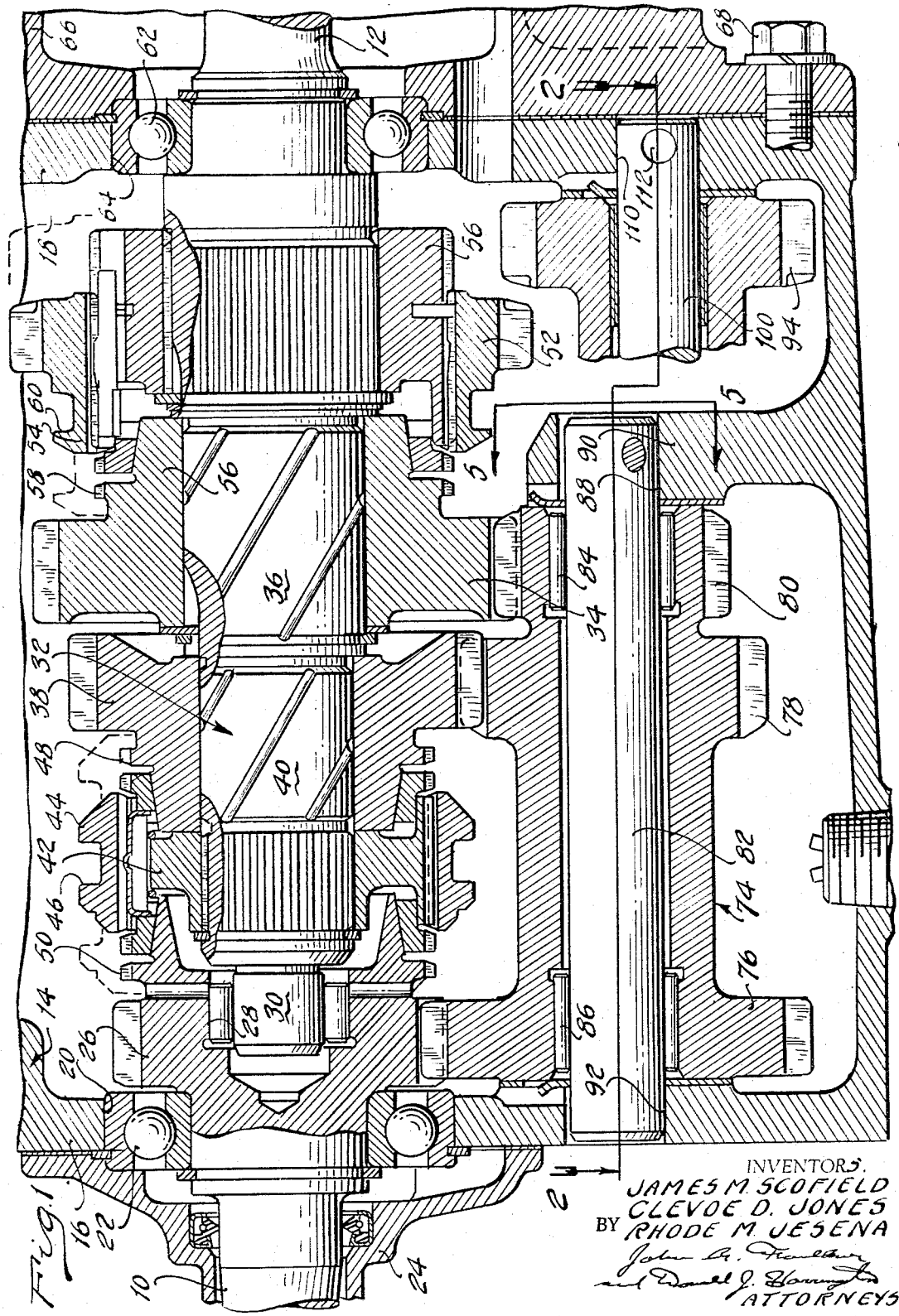
INVENTORS.
JAMES M. SCOFIELD
CLEVOE D. JONES
RHODE M. JESENA
BY
ATTORNEYS

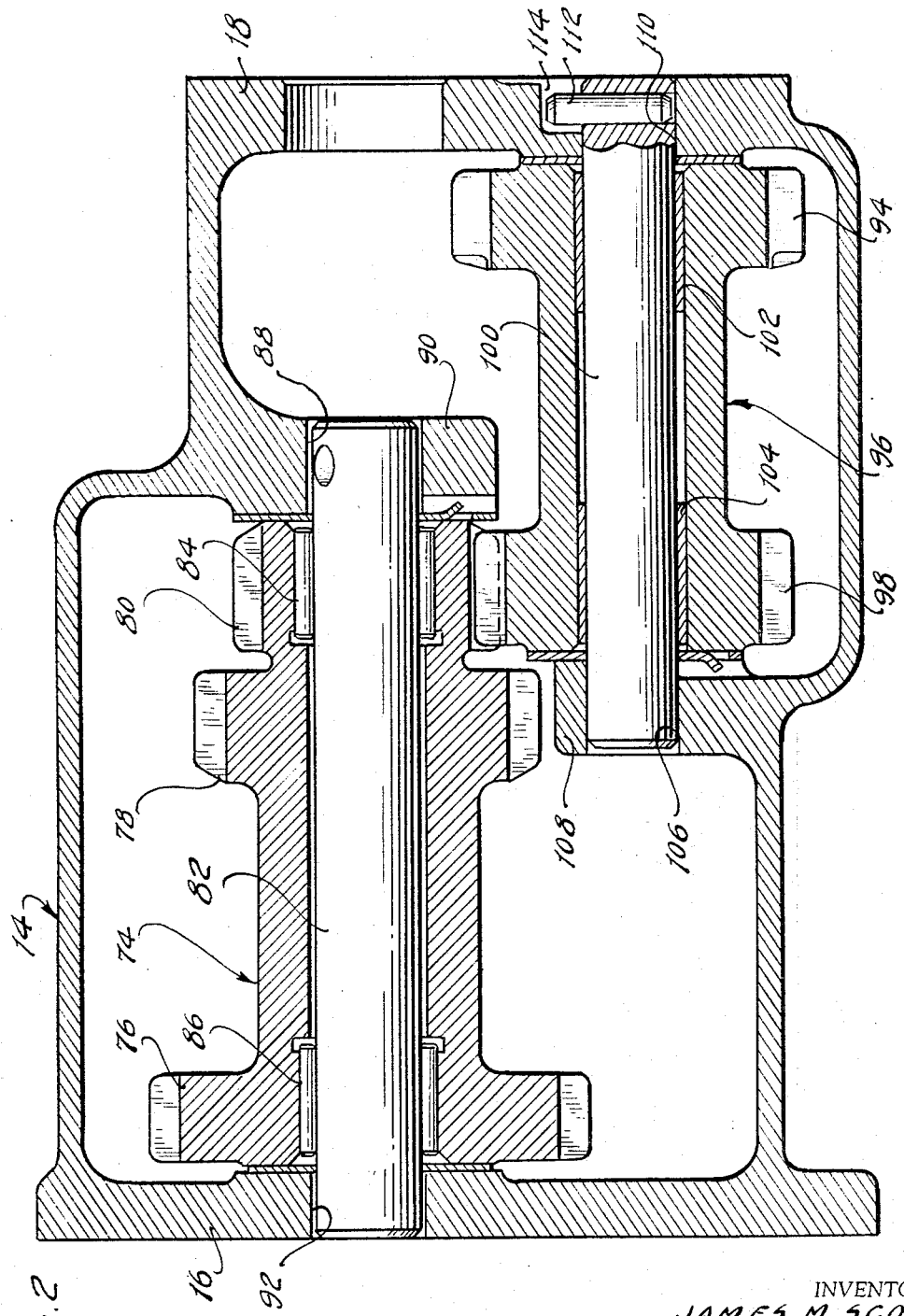

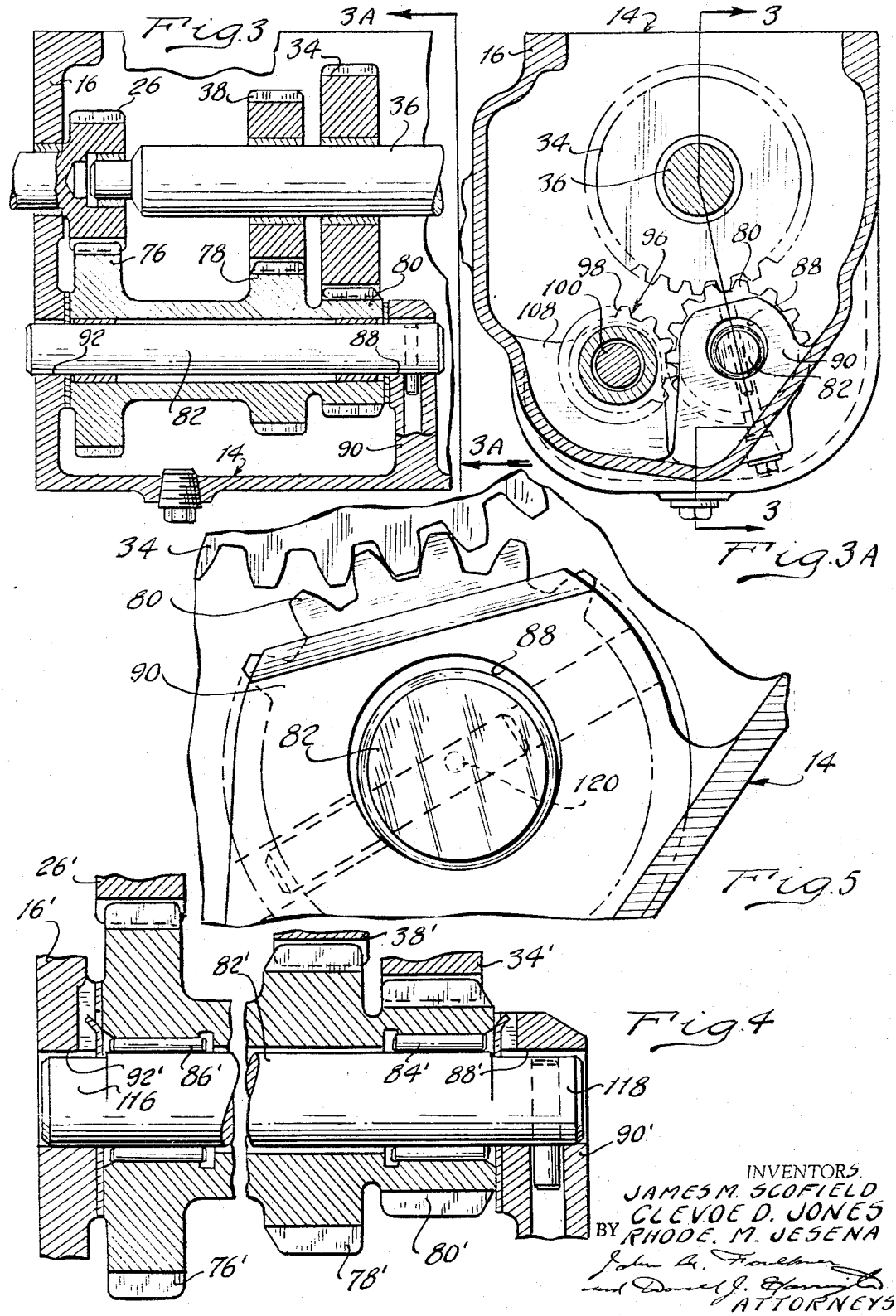

United States Patent Office 3,292,446
Patented Dec. 20, 1966

3,292,446
POWER TRANSMITTING GEARING WITH FULL
FLOATING GEAR ELEMENTS
James M. Scofield, Farmington Township, Clevoe D. Jones, Franklin, and Rhode M. Jesena, Detroit, Mich., assignors to Ford Motor Company, Dearborn, Mich., a corporation of Delaware
Filed Oct. 31, 1963, Ser. No. 320,346
5 Claims. (Cl. 74—333)

Our invention relates generally to power transmission mechanisms having multiple speed ratio gearing capable of establishing plural torque delivery paths between a driving member and a driven member. Our invention is adapted particularly to be used in manually controlled countershaft gearing in an automotive vehicle driveline.

In a power transmission mechanism of known construction, an engine driven power input shaft and a power output shaft are mounted in coaxial disposition in a transmission housing. The power output shaft is connected directly to a coaxial intermediate shaft upon which torque transmitting gears are mounted for rotation. A power input gear of the mechanism is connected directly to the power input shaft.

A cluster gear assembly is mounted for rotation in the housing about an axis that is parallel with respect to the axis of the intermediate shaft. It includes multiple gear elements that engage the power input gear and the gears rotatably mounted upon the intermediate shaft. Selectively engageable synchronizer clutch means are provided for connecting the intermediate shaft to any one of the torque transmitting gears to establish the various driving speed ratios.

The cluster gear assembly is supported by a countershaft that is fixed to the transmission housing. During operation of the mechanism in an underdrive ratio, the cluster gear assembly functions as part of the torque transmitting path. During operation in a direct drive high-speed ratio, however, the power input gear is connected directly to the intermediate shaft. Torque is not transmitted through the cluster gear assembly under these conditions, but the cluster gear assembly is caused to rotate during high speed ratio operation since the power input gear remains in driving engagement with its associated gear element.

It has been found that during operation in the high speed ratio a considerable amount of gear rattle develops at certain critical operating speeds. This is due to torsional vibration of the torque transmitting elements of the gear system which in turn causes high frequency impact of the teeth of the idling gears in the mechanism.

It is an object of our invention to overcome this gear rattle condition by providing a gear system with variable backlash between the individual gear elements.

It is a further object of our invention to provide a countershaft gearing system of the type above set forth wherein provision is made for varying the center distance between the torque transmitting gearing mounted on the intermediate shaft and the gear elements of the cluster gear assembly.

It is a further object of our invention to provide a countershaft gearing arrangement of the type above set forth wherein the gear elements of the cluster gear assembly are adapted to float so that the center distance between these gear elements and the torque transmitting gears may vary within predetermined limits.

For the purpose of describing our invention more particularly, reference will be made to the accompanying drawings, wherein:

FIGURE 1 shows a longitudinal cross-sectional view of a gear system that is adapted to be used in the driveline of an automotive vehicle, FIGURE 2 is a cross-sectional subassembly view taken along the plane of section line 2—2 of FIGURE 1, FIGURE 3 shows in schematic form the gearing of FIGURE 1, FIGURE 3a is an end view of the structure of FIGURE 3 taken along the plane of section line 3a—3a of FIGURE 3, FIGURE 4 shows a modified countershaft arrangement for use in a gearing system of the type shown in FIGURE 1, and FIGURE 5 is an end view of the structure of FIGURE 4 taken along the plane of section line 5—5 of FIGURE 1.

Referring first to FIGURE 1, numeral 10 designates a power input shaft that may be connected to an internal combustion vehicle engine by means of a neutral clutch in a conventional fashion. Numeral 12 designates a power output shaft or tailshaft which may be connected to the vehicle traction wheels through a suitable driveline.

Numeral 14 generally indicates a power transmission housing. It includes a forward wall 16 and a rearward wall 18. Shaft 10 is journalled within an opening 20 in the wall 16 by means of a bearing 22. A clutch throwout bearing sleeve shaft 24 is secured to the exterior of the wall 16 and extends concentrically with respect to shaft 10.

A power input gear 26 is connected directly to the shaft 10. It is formed with a pilot bearing opening 28 within which is journalled a pilot extension 30 formed on an intermediate shaft 32. Intermediate shaft 32 is connected directly to and forms an extension of the power output shaft 12.

A low speed gear 34 is mounted upon a bearing portion 36 of the intermediate shaft 32. It is adapted to rotate relative to shaft 32 but is held axially fast thereon. A second speed ratio gear 38 is journalled upon a bearing portion 40 of the shaft 32. Like the gear 34, gear 38 can rotate relative to shaft 32 but is held axially fast thereon.

A synchronizer clutch hub 42 is splined to the left-hand end of the intermediate shaft 32. A synchronizer clutch sleeve 44 is carried by the hub 42 and is adapted to move axially relative thereto. Rotation of sleeve 44 with respect to hub 42 is prevented.

Sleeve 44 includes a groove 46 that may receive the ends of a shifter fork in a conventional fashion. The shifter fork, in turn, is under the control of the vehicle operator so that the sleeve 44 can be moved axially in either one direction or the other from the neutral position shown in FIGURE 1.

Gear 38 carries synchronizer clutch teeth 48 which may engage internal teeth formed within the sleeve 44. As the sleeve 44 is shifted in a right-hand direction, it establishes a direct connection between gear 38 and shaft 32. Power input gear 26 also is formed with clutch teeth as shown at 50. These may be engaged by the internal teeth of sleeve 44. As the sleeve 44 is shifted in a left-hand direction, it establishes a direct connection between power input shaft 10 and the shaft 32.

The structural details and the mode of operation of the synchronizer clutch assembly of which hub 42 and sleeve 44 form a part are well known to those skilled in the art and for this reason it need not be elaborated upon in this description. A reverse gear is shown at 52. It defines an internally splined synchronizer clutch sleeve 54 which in turn is carried by an externally splined clutch hub 56. This hub is splined directly to the intermediate shaft 32.

As the sleeve 54 is shifted in a left-hand direction, as viewed in FIGURE 1, its internal spline teeth engage external clutch teeth 58 carried by the gear 34. This establishes a direct connection between shaft 32 and gear 34.

Sleeve 54 is formed with a groove 60 which may receive the ends of a shifter fork that is under the control of the vehicle operator. Axial movement of the sleeve 54 can be accomplished by appropriately adjusting the shifter fork.

Intermediate shaft 32 is journalled by means of a bearing 62 within an opening 64 formed in the end wall 18. A tailshaft extension housing 66 is connected on the outboard side of the wall 18 by means of bolts 68.

The upper end of the housing 14 is provided with an access opening that is covered by a coverplate held in place by bolts.

A cluster gear assembly is indicated generally by reference character 74. It includes a first gear element 76, a second gear element 78 and a third gear element 80. Each gear element forms a part of an integral assembly. The gear element 76 engages continuously the power input gear 26. Gear element 78 engages continuously the intermediate speed ratio gear 38 and the gear element 80 engages continuously the low speed ratio gear 34.

The cluster gear assembly is mounted for rotation about a countershaft 82 by means of spaced needle bearings 84 and 86. One end of the countershaft 82 is received within an opening 88 formed in a cluster gear assembly supporting boss 90. The other end of the countershaft 82 is received within an opening 92 formed in the wall 16.

Gear 52 can be shifted in a right-hand direction upon the hub 56 until it engages reverse gear element 94. This forms a part of a reverse pinion assembly that is identified generally in FIGURE 2 by reference character 96. The reverse pinion assembly includes also a second gear element 98 which engages continuously the gear element 80 of the cluster gear assembly 74.

Gear elements 94 and 98 form a part of an integral assembly that is centrally apertured and mounted upon a second countershaft 100. Spaced bearings 102 and 104 provide support for the assembly 96.

One end of countershaft 100 is received within an opening 106 formed in a boss 108 which forms a part of the housing 14. The other end of the shaft 100 is received within an opening 110 formed in the end wall 18.

A retainer pin 112 is received through the end of countershaft 100 and extends into a slot 114 formed in the wall 118. This prevents rotation of the shaft 100 with respect to the housing. By preference, the shaft 100 is held in place by a press fit.

To establish first speed ratio operation in the forward driving range, sleeve 54 is shifted in a left-hand direction so that gear 34 becomes locked to shaft 32. The torgue delivery path then is defined by shaft 10, power input gear 26, gear element 76, gear element 80, gear 34, shaft 32 and power output shaft 12.

To establish second speed ratio operation in the forward driving range, sleeve 54 is returned to the position shown in FIGURE 1, and sleeve 44 is shifted in a right-hand direction thereby locking gear 38 to the shaft 32. The torque delivery path then is defined by shaft 10, gear 26, gear element 76, gear element 78, gear 38, shaft 32, and power output shaft 12.

To establish direct drive or third speed ratio operation in the forward driving range, sleeve 54 remains in the neutral position shown in FIGURE 1 and the sleeve 44 is shifted in a left-hand direction thereby locking directly the gear 26 to the shaft 32. This establishes a direct driving connection between shafts 10 and 12 and the cluster gear assembly forms no part of the power delivery gear train.

To establish reverse drive operation, sleeve 44 is shifted to the intermediate position shown in FIGURE 1. Sleeve 54 is shifted in a right-hand direction so that gear 52 engages gear element 94. The reverse idler assembly thus becomes a part of the torque delivery path. The complete path is defined by shaft 10, gear 26, gear element 76, gear element 80, gear element 98, gear element 94, gear 52, shaft 32 and power output shaft 12. The reverse idler acts to reverse the direction of rotation of the gear 52 and the shaft 12 with respect to the direction of rotation of the shaft 10.

Heretofore it has been conventional practice to mount the ends of the countershaft 82 within openings formed in the transmission housing by means of a force fit. Thus, the center distance between the cluster gear assembly and the main torque delivery gears in the gear system remains fixed. In our improved arrangement, however, provision is made for allowing the cluster gear assembly 74 to float relative to the shaft 32 and the torque transmitting gears 26, 38, 34 and 52.

In FIGURES 3 and 4, we have shown two different arrangements that may be employed for accomplishing the desired floating action for the cluster gear assembly 74. In the embodiment shown in FIGURE 3, the shaft 82 is mounted within the openings 92 and 88 with a substantial degree of clearance. These openings 92 and 88 may be formed oversize so that their diameters are as large as approximately .0200 inch greater than the diameter of the shaft 82. In an automotive vehicle driveline having an internal combustion engine with a displacement at least approximately 170 cu. in., the diameter of the opening 92 should be such that the clearance is between .010 inch and .030 inch. In the case of the rear bearing mount, the diameter of the opening 88 should be such that the clearance is between .007 inch and .020 inch. The view of FIGURE 3 is simply a schematic representation of the structure shown in FIGURE 1 and the openings 92 and 88 have been shown with exaggerated dimensions in order to emphasize the desired clearance.

In the embodiment shown in FIGURE 4, the ends 116 and 118 for the shaft 82' are formed with relieved ends so that they are undersize with respect to the associated openings 92' and 88', respectively. The portions of the structure in FIGURE 4 that have counterpart elements in the embodiments of FIGURES 1, 2 and 3 have been identified by similar reference characters although primed notations have been added.

The central axis of the end portions 116 and 118 is offset with respect to the axis of the intermediate portion of shaft 82' after they are relieved. Thus, in both of the embodiments described, the center distance between the cluster gear assembly and the torque transmitting gears of the system can change.

In FIGURE 5 we have shown in schematic form the relationship between one end of the countershaft 82 and its associated opening 88. The same relationship, of course, holds true for the end 118 of countershaft 82' and its associated opening 88'. During operation, the central axis of the countershaft 82 may shift so that it will define a plane of motion that is identified in FIGURE 5 by reference character 120. This shift is due to the camming action between the surfaces of the oversize openings 88 and 92 and the shaft 82. As the countershaft shifts in this fashion, the center distance for the gearing changes accordingly. Furthermore, the backlash at each gear tooth contact changes. During operation in direct drive the constant mesh gears operate with a backlash of .0012 to approximately .0016 inch. This compares to the backlash in a conventional gearing arrangement of approximately .004 to .008 inch.

During operation of the transmission mechanism in the direct drive high speed ratio, torsional vibration forces that are transmitted to the rotary torque delivery portions of the mechanism will be transferred to the gear elements of the cluster gear assembly 74 in the usual fashion. But since the shaft 82 is free to float in response to the application of such vibration forces to the associated gear elements, the axis of the shaft 82 will shift along the plane 120. The floating condition will provide a variable backlash and interrupt the path over which the vibration forces normally are transmitted back to the power transmitting gear system so that a resonant vibration condition at the various critical speeds is avoided. This in turn results in elimination of the gear rattle problem.

Having thus described preferred embodiments of our invention, what we claim and desire to secure by United States Letters Patent is:

1. A power transmission mechanism adapted to deliver driving torque from a driving shaft to a driven shaft, a housing, said shafts being mounted for rotation about a common axis extending through said housing, a power input gear connected to said driving shaft, a plurality of power output gears rotatably mounted for rotation about said driven shaft, a cluster gear assembly mounted for rotation about an axis that is parallel to said common axis, said cluster gear assembly including a plurality of gear elements, each gear element of said cluster gear assembly being in meshing engagement with a separate one of said gears, means for clutching selectively said power input gear and each of said power output gears to said driven shaft, means for rotatably mounting said cluster gear assembly for shifting movement with respect to said common axis whereby the effective center of rotation of said cluster gear assembly will vary during operation of said mechanism under torque, a reverse idler gear assembly rotatably mounted for rotation about an axis that is parallel to said common axis and the axis of said cluster gear assembly, a reverse gear carried by said driven shaft, means for preventing relative rotation of said reverse gear with respect to said driven shaft while accommodating axial shifting movement therebetween, said reverse idler gear assembly including a gear element engageable with one element of said cluster gear assembly and a second gear element adapted to be engaged by the reverse gear as the latter is shifted axially in one direction, said mounting means comprising a countershaft extending in a direction generally parallel to the axis of said gears, the gear elements of said cluster gear assembly being journaled rotatably upon said countershaft, and spaced circular openings in said housing adjacent the ends of said countershaft, the ends of said countershaft being received within said openings, the clearance between one of said countershaft ends adjacent said power input gear and its surrounding circular opening being between .015 inch and .030 inch, the clearance between the other countershaft end remote from said input gear and its surrounding circular opening being between .007 inch and .020 inch, said countershaft and said openings establishing camming action between said housing and said countershaft whereby the effective center of rotation of said countershaft can shift to provide a varying center distance between the axis of said gears and the axis of said countershaft and to provide a shifting movement out of parallel disposition of said countershaft with respect to said common axis, the axis of said countershaft being adapted to move in a cylindrical plane upon the displacement of the ends of said countershaft in their respective housing openings, the center of said one end of said countershaft being displaced transversely to one side of a reference plane containing said common axis and the axis of said countershaft during delivery of torque from said driving shaft to said driven shaft while the center of said other countershaft end is displaced to the other side of said reference plane, the centers of said countershaft ends being displaced to opposite sides of said reference plane when torque is delivered during coasting operation from said driven shaft to said driving shaft, the backlash between said gears and said cluster gear elements being maintained at predetermined values at all times regardless of the direction of torque delivery.

2. In a power transmission mechanism adapted to deliver driving torque from a driving member to a driven member, a plurality of gear elements including a power input gear a power output gear and idler gear elements disposed in driving relationship with respect to said power input and power output gears, said power input gear being connected to said driven member, said power output gear being connected to said driven member, clutch means for connecting directly said driving member and said driven member thereby bypassing the torque delivery path made available in part by said idler gear elements, means for rotatably mounting said idler gear elements for floating movement in a direction transverse to the axes of said power input gear and said power output gear, a countershaft, relatively stationary supporting walls, and openings formed in said walls for receiving the end portions of said countershaft, said idler gear elements being rotatably journalled upon said countershaft, the openings in said walls being oversize with respect to the diameter of said countershaft whereby said idler gears are adapted for floating movement with respect to said power input gear and said power output gear, the countershaft end portion received within said wall openings and said wall openings being circular, the geometric centers of said end portions being offset with respect to the centerline of said idler gear elements.

3. A power transmission mechanism adapted to deliver driving torque from a driving shaft to a driven shaft, said shafts being mounted for rotation about a common axis, a power input gear connected to said driving shaft, a plurality of power output gears rotatably mounted for rotation about said driven shaft, a cluster gear assembly mounted for rotation about an axis that is parallel to said common axis, said cluster gear assembly including a plurality of gear elements, each gear element of said cluster gear assembly being in meshing engagement with a separate one of said gears, means for clutching directly and selectively said power input gear and each of said power output gears to said driven shaft, said cluster gear assembly comprising a countershaft, a relatively stationary housing portion for end supporting said countershaft, said housing portion including spaced openings for receiving the end portions of said countershaft, said openings being oversize with respect to the diameter of said countershaft end portions whereby said cluster gear assembly is adapted for floating movement with respect to the axis of said gears the geometric centers of said end portions being offset with respect to the axis of said cluster gear assembly.

4. A power transmission mechanism adapted to deliver driving torque from a driving shaft to a driven shaft, said shafts being mounted for rotation about a common axis, a power input gear connected to said driving shaft, a plurality of power output gears rotatably mounted for rotation about said driven shaft, a cluster gear assembly mounted for rotation about an axis that is parallel to said common axis, said cluster gear assembly including a plurality of gear elements, each gear element of said cluster gear assembly being in meshing engagement with a separate one of said gears, means for clutching directly and selectively said power input gear and each of said power output gears to said driven shaft, a reverse idler gear assembly rotatably mounted for rotation about an axis that is parallel to said common axis and the axis of said cluster gear assembly, a reverse gear carried by said driven shaft, means for preventing relative rotation of said reverse gear with respect to said driven shaft while accommodating axial shifting movement therebetween, said reverse gear assembly including a gear element engagable with one element of said cluster gear assembly and a second gear element adapted to be engaged by the reverse gear as the latter is shifted axially in one direction, said cluster gear assembly comprising a countershaft, a relatively stationary housing portion for end supporting said countershaft, said housing portion including spaced openings for receiving the end portions of said countershaft, said openings being oversize with respect to the diameter of said countershaft end portions whereby said cluster gear assembly is adapted for floating movement with respect to said common axis, said countershaft end portions being formed with a geometric center that is offset with respect to the geometric center of said cluster gear assembly.

5. A power transmission mechanism adapted to deliver driving torque from a driving shaft to a driven shaft, said shafts being mounted for rotation about a common axis, a power input gear connected to said driving shaft, a plurality of power output gears rotatably mounted for rotation about said driven shaft, a cluster gear assembly mounted for rotation about an axis that is parallel to the axis of said common shaft, said cluster gear assembly including a plurality of gear elements, each gear element of said cluster gear assembly being in meshing engagement with a separate one of said gears, means for clutching directly and selectively said power input gear and each of said power output gears to said driven shaft, said cluster gear assembly comprising a countershaft, relatively stationary housing portions for end supporting said countershaft, said cluster gear assembly being rotatably journalled for rotation upon said countershaft, said housing portions defining openings for receiving the ends of said countershaft, said countershaft ends being formed with a reduced diameter so that the axes of said ends are offset with respect to the principal axis of said countershaft, the diameter of said openings being greater than the diameter of said countershaft ends.

References Cited by the Examiner
UNITED STATES PATENTS

| | | | |
|---|---|---|---|
| 3,109,317 | 11/1963 | Cousino et al. | 74—411 |
| 3,150,530 | 9/1964 | Pittman et al. | 74—333 |

DAVID J. WILLIAMOWSKY, *Primary Examiner.*

H. S. LAYTON, *Assistant Examiner.*